United States Patent
Turek et al.

(10) Patent No.: US 10,214,389 B2
(45) Date of Patent: Feb. 26, 2019

(54) DRIVE CHAIN AND DRIVE CHAIN MECHANISM AND CONVEYOR COMPRISING SUCH A DRIVE CHAIN MECHANISM

(71) Applicants: Otis Elevator Company, Farmington, CT (US); Alexander Turek, Münchendorf (AT)

(72) Inventors: Alexander Turek, Münchendorf (AT); Walter Srb-Gaffron, Baden (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/532,231

(22) PCT Filed: Dec. 2, 2014

(86) PCT No.: PCT/EP2014/076209
§ 371 (c)(1),
(2) Date: Jun. 1, 2017

(87) PCT Pub. No.: WO2016/086964
PCT Pub. Date: Jun. 9, 2016

(65) Prior Publication Data
US 2017/0275139 A1 Sep. 28, 2017

(51) Int. Cl.
*B66B 21/02* (2006.01)
*B66B 21/10* (2006.01)
(Continued)

(52) U.S. Cl.
CPC ............ *B66B 23/024* (2013.01); *B66B 21/02* (2013.01); *B66B 21/10* (2013.01); *B66B 23/026* (2013.01);
(Continued)

(58) Field of Classification Search
CPC ..... B66B 23/024; B66B 23/026; B66B 21/10; B66B 23/12; B66B 21/02; F16G 13/02; F16G 15/12
See application file for complete search history.

(56) References Cited

U.S. PATENT DOCUMENTS 994,879 A 6/1911 Seeberger
4,232,783 A * 11/1980 Kraft ................. B66B 23/02
198/851

(Continued)

FOREIGN PATENT DOCUMENTS

DE 10218373 A1 11/2003
DE 20221369 U1 8/2005
(Continued)

OTHER PUBLICATIONS

International Search Report and Written Opinion for application PCT/EP2014/076209, dated Oct. 13, 2015, 15pgs.

*Primary Examiner* — Mark A Deuble
(74) *Attorney, Agent, or Firm* — Cantor Colburn LLP

(57) ABSTRACT

A drive chain (2a, 2b) for a chain drive comprises a plurality of chain links (10, 20) and joints (30) respectively connecting two of the chain links (10, 20) forming the drive chain (2a, 2b). The drive chain (2a, 2b) further comprises a plurality of carrier elements (40), each of said carrier elements (40) being linked to one of the chain links (10, 20) or joints (30) and supporting at least two support/engagement elements (43, 44), which are configured for supporting the drive chain (2a, 2b) and/or for engagement with an appropriate turnaround element (50; 90) for driving the drive chain (2a, 2b).

25 Claims, 14 Drawing Sheets

(51) Int. Cl.
  *B66B 23/02* (2006.01)
  *B66B 23/12* (2006.01)
  *F16G 13/02* (2006.01)
  *F16G 15/12* (2006.01)
(52) U.S. Cl.
  CPC .............. *B66B 23/12* (2013.01); *F16G 13/02* (2013.01); *F16G 15/12* (2013.01)

(56) References Cited

U.S. PATENT DOCUMENTS

| | | | |
|---|---|---|---|
| 4,730,717 A | 3/1988 | Sugita | |
| 4,953,685 A | 9/1990 | Johnson | |
| 5,325,955 A * | 7/1994 | Ahls | B66B 23/02 198/326 |
| 5,819,910 A * | 10/1998 | Langer | B66B 23/02 198/330 |
| 6,945,379 B2 | 9/2005 | Hauer et al. | |
| 6,988,608 B2 | 1/2006 | Pietz | |
| 7,401,691 B2 | 7/2008 | Ishikawa et al. | |
| 7,568,571 B2 | 8/2009 | Ogimura et al. | |
| 7,918,326 B2 | 4/2011 | Illedits et al. | |
| 8,292,059 B2 | 10/2012 | Grobbel | |
| 2007/0137980 A1 * | 6/2007 | Meyer | B66B 23/02 198/327 |

FOREIGN PATENT DOCUMENTS

| | | |
|---|---|---|
| EP | 1344740 B1 | 9/2007 |
| EP | 1333001 B1 | 9/2009 |
| GB | 815374 A | 6/1959 |
| JP | S5325345 U | 6/1978 |
| KR | 100759677 B1 | 9/2007 |
| WO | 2010103196 A1 | 9/2010 |
| WO | 2014086716 A1 | 6/2014 |
| WO | 2014140696 A1 | 9/2014 |

* cited by examiner

DRIVE CHAIN AND DRIVE CHAIN MECHANISM AND CONVEYOR COMPRISING SUCH A DRIVE CHAIN MECHANISM

BACKGROUND OF THE INVENTION

People conveyors, as e.g. escalators and moving walkways, are usually driven by chain drives including at least one endless drive chain which extends between two turnaround portions and which is formed by a plurality of links pairwise connected by joints. Each joint is provided with a support and engagement element, typically a roller, which is configured for engagement with a corresponding turnaround element, typically a sprocket, for driving the chain. Between the turnaround portions of the chain, which are located below landing areas provided at both ends of the conveyor, the rollers are guided and supported by guide rails extending between said turnaround portions.

In order to reduce the polygonal effect, which is generated when the moving chain is deflected from a straight path of travel in the turnaround portions, and for reducing the load, which is to be carried by each roller supporting the chain on the guide rails, a large number of rollers, i.e. a large number of chain links is preferable. On the other hand, increasing the number of links may cause adverse effects, as e.g. increasing the abrasion resistance and wear of the chain, reducing the robustness of the chain and increasing the costs for production, installation and maintenance.

In consequence, it is desirable to reduce the number of chain links of the drive chain without increasing the polygonal effect and/or the load to be supported by each of the rollers.

DISCLOSURE OF THE INVENTION

According to an exemplary embodiment of the invention, a drive chain for a chain drive has a plurality of chain links and joints connecting two of the links forming the chain, respectively, and a plurality of carrier elements. Each of said carrier elements is pivotably linked to one of the chain links or joints and supports at least two support/engagement elements, which are configured for supporting the chain and/or for engagement with an appropriate turnaround element, which may be configured for driving the chain.

Thus, a drive chain according to an exemplary embodiment of the invention comprises at least twice as many support/engagement elements as chain links. This considerably reduces the load to be supported by each of the support/engagement elements.

In addition, the additional flexibility provided by the pivotable connection between the chain and the carrier element allows to reduce the polygonal effect without increasing the number of chain links.

Thus, a drive chain according to an exemplary embodiment of the invention provides the advantages which are related to an increased number of support and engagement elements without causing the disadvantages which are usually connected to increasing the number of chain links.

SHORT DESCRIPTION OF THE FIGURES

FIG. 1 shows a schematic view of a people conveyor as it is known from the prior art.

FIG. 2 shows a portion of a chain drive according to an exemplary embodiment of the invention.

FIG. 3 shows an enlarged explosive view of two adjacent chain links and two associated carrier units located inside the chain links.

FIG. 4 shows the same portion of the drive system shown in FIG. 2 together with two conveyor elements configured for supporting and conveying passengers.

FIG. 5 shows a schematic side view of a drive chain in engagement with a turnaround element according to a first exemplary embodiment of the invention.

FIG. 6 shows an example of one of the outer/inner carrier elements forming the carrier units.

FIG. 7 shows an alternative embodiment of a drive mechanism, in which the turnaround element is configured for engagement with the axles of the joints.

FIG. 8 shows an embodiment, in which the turnaround element is configured to engage with the axles of the joints at a position in between the chain links elements.

FIG. 9 shows an embodiment, in which the turnaround element is configured to engage with the axles of the joints at a position located outside the chain links elements.

FIG. 10 shows an embodiment, in which the carrier units are positioned outside the chain links elements.

FIG. 11 shows a schematic view of a people conveyor comprising a drive chain according to an embodiment of the invention.

FIGS. 12a and 12b show a view and an explosive view of arc bucket step according to a first embodiment.

FIGS. 12c and 12d show a view and an explosive view of arc bucket step according to a second embodiment.

FIG. 13 shows a section of an escalator section comprising arc bucket steps in combination with a separate step chain.

FIG. 14 shows a section of an escalator section comprising arc bucket steps forming the step chain.

DESCRIPTION OF THE FIGURES

Exemplary embodiments of the invention will be described in more detail with reference to the enclosed figures.

Figure 1:
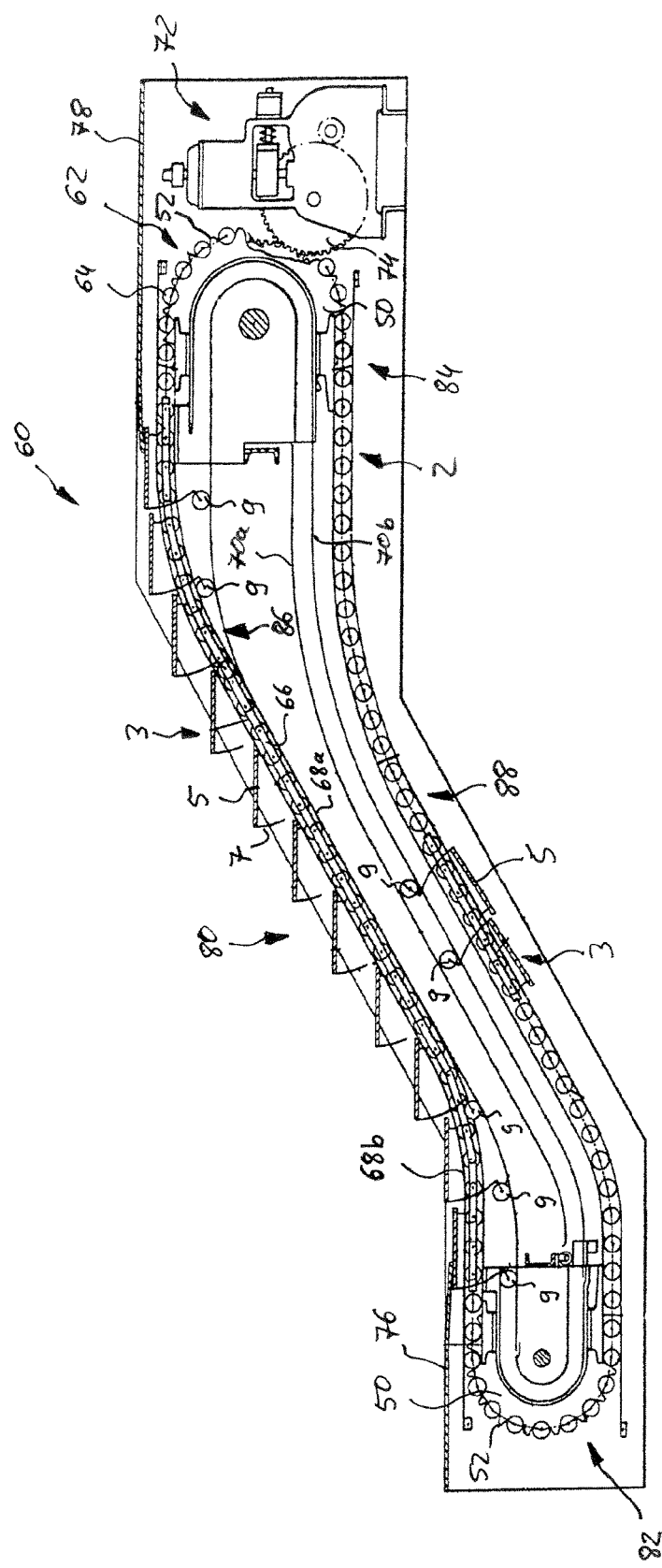
FIG. 1 shows a schematic view of a people conveyor 60, in particular an escalator 60, as it is known from the prior art.

The people conveyor 60 comprises an inclined portion 80 extending between a lower landing area 76 and an upper landing area 78.

The people conveyor 60 further comprises a plurality of moving steps 3 respectively having a horizontal portion/tread plate 5 and a basically vertical arcuate riser portion 7. The steps 3 are linked to an endless step chain 62, which extends between upper and lower turnaround elements 50 respectively provided in lower and upper turnaround portions 82, 84 below the lower and upper landing areas 76, 78. The turnaround elements 50 are respectively provided as sprockets 50 comprising a plurality of engagement portions 52 or teeth.

The endless step chain 62 comprises a plurality of step chain links 66 which are pairwise coupled to each other by step chain rollers 64. The step chain rollers 64 are guided by step chain guide rails 68a, 68b extending between the lower and upper landing areas 76, 78 providing an upper conveyor path 86 for conveying the passengers and a lower return path 88 for returning the steps 3. Each third step chain roller 64 is connected to a respective step 3 and the pitch of the steps 3 is three times the pitch of the step chain 62.

The steps 3 further comprise step rollers 9, which are guided by corresponding step roller guide rails 70a, 70b extending basically parallel but in varying distance to the step chain guide rails 68a, 68b for causing the steps 3 to pivot in the lower and upper transition portions of the escalator (where the horizontal track of the steps 3 changes to an inclined track) and in the lower and upper turnaround portions 82, 84. Due to pivoting the steps 3 in the turnaround portions 82, 84 they need less space when traveling along the lower return path 8.

The upper sprocket 50 is coupled by means of chain drive gears 74, 75 to a chain drive/motor 72 which is configured for driving the upper sprocket 50 in order to move the step chain 62 and the steps 3 linked to said step chain 62.

In order to reduce the polygonal effect, which always occurs when a moving chain is deflected from a straight path as the step chain 62 in the turnaround portions 82, 84 of the people conveyor 60 shown in FIG. 1, and to reduce the load, which is to be carried by each step chain roller 62, three step chain links 66 and step chain rollers 64 are provided for every step 3, respectively. The large number of chain links 66 has disadvantages in that the chain has a relatively large abrasion resistance and wear and is less robust. Moreover, the size of the gaps formed in between two consecutive steps 3 inevitably varies along the endless track, particularly in the transition portions.

As mentioned before, it is an object of the present invention to allow a reduction of the number of step chain links 66 without increasing the polygonal effect and/or the load to be carried by each of the step chain rollers 64.

Figure 2:
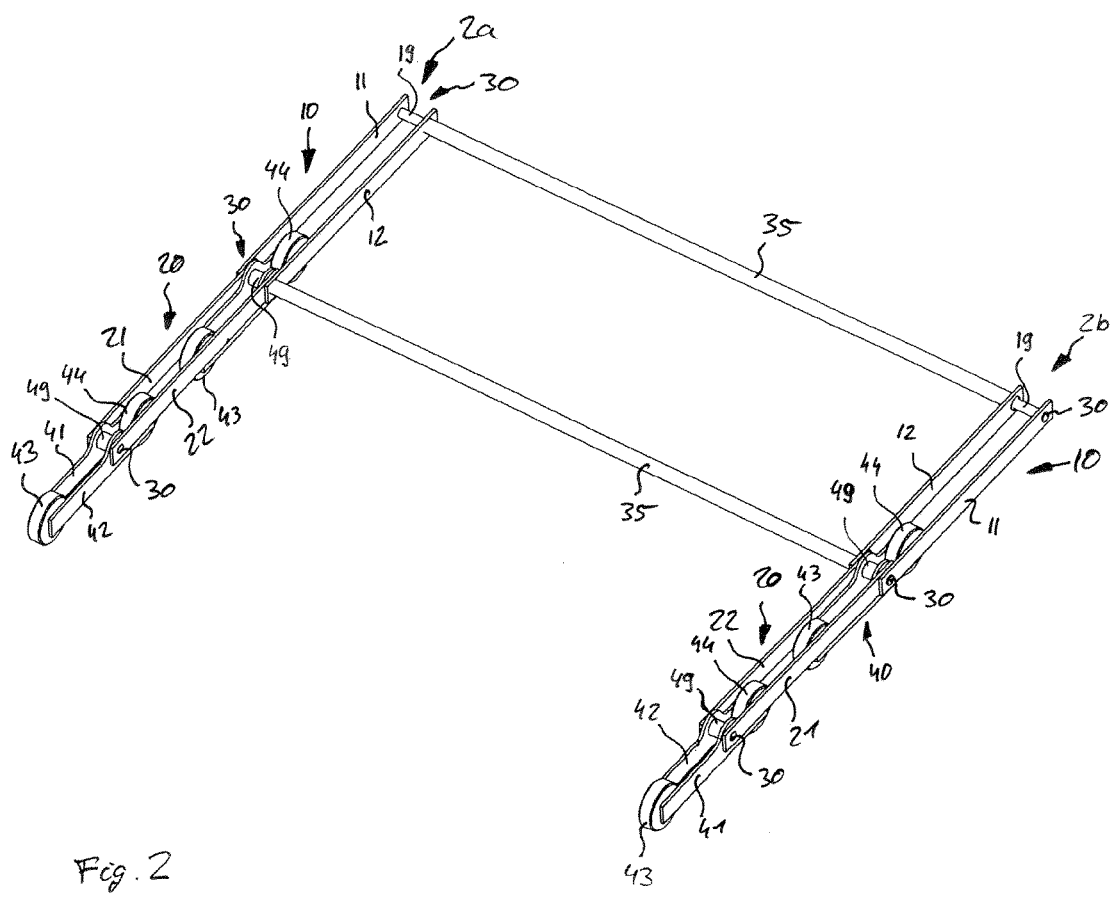

FIG. 2 shows a portion of a chain drive according to an exemplary embodiment of the invention which includes two drive chains 2a, 2b extending parallel of each other in a longitudinal direction, which also is the conveying direction of the chain drive.

Each of the drive chains 2a, 2b comprises a plurality of chain links 10, 20, which are pivotably linked to each other by a plurality of joints 30 respectively linking two adjacent end portions of adjacent chain links 10, 20.

Step axles 35, which are mounted to the joints 30, respectively connect a joint 30 of the first drive chain 2a with a corresponding joint 30 of the second drive chain 2b forming a rigid rectangular framework for providing a mechanically stable driving structure.

Carrier units 40 respectively supporting two support/engagement elements 43, 44 are pivotably linked to each of the joints 30. In the embodiment shown in FIG. 2 the support/engagement elements 43, 44 are provided in the form of rollers 43, 44 similar to the step chain rollers 64 shown in FIG. 1.

Figure 3:
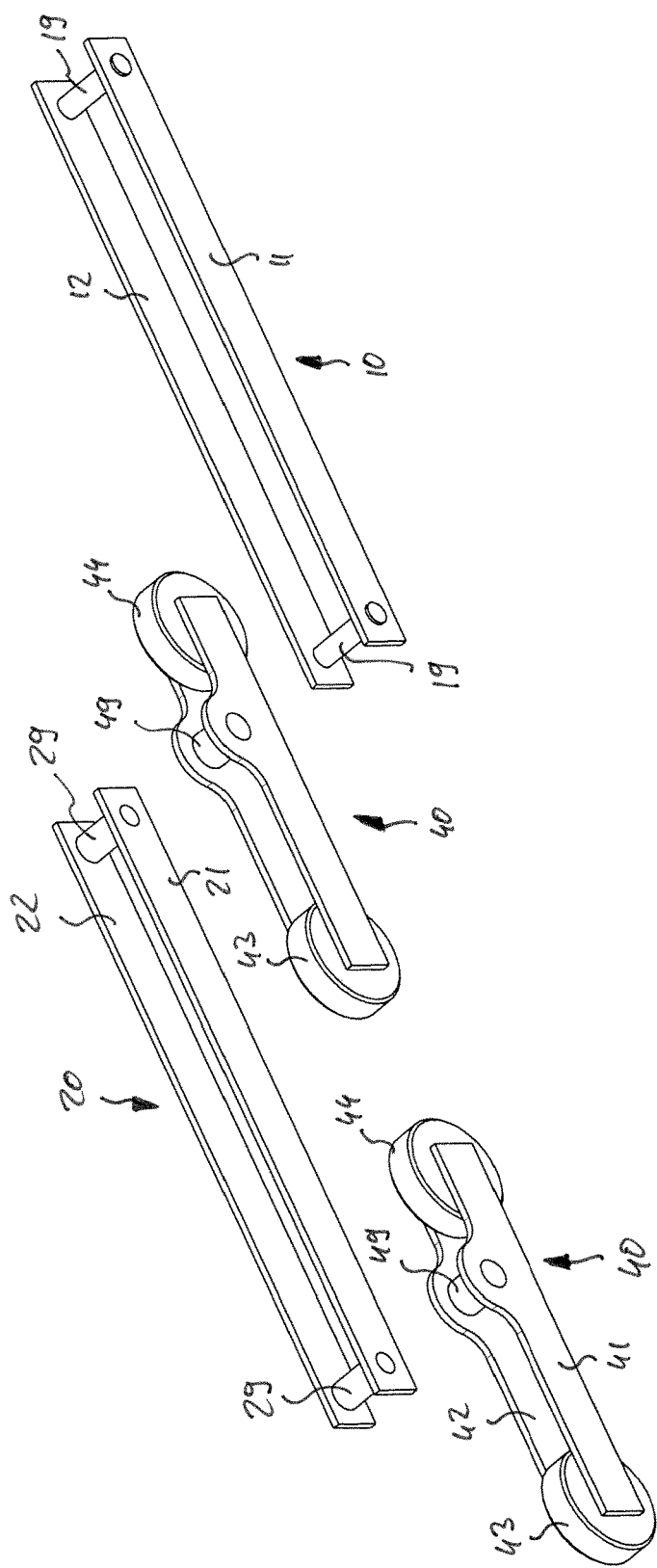

FIG. 3 shows an explosive figure of a pair of chain links 10, 20 with two associated carrier units 40.

The chain links 10, 20 of each of the drive chains 2a, 2b form rigid rectangular frameworks constituted by two longitudinal chain link elements 11/12 and 21/22, respectively, connected by chain links axles 19 and 29, respectively. For each chain link 10, 20 an outer longitudinal chain link element 11, 21 and an inner longitudinal chain link element 12, 22 respectively extend parallel to each other and form in combination with the axles 19, 29 of the respective chain link 10, 20 a rigid rectangular framework.

The chain links 10, 20 are provided as outer chain links 10 and inner chain links 20, wherein, in the assembled state, the longitudinal chain link elements 21, 22 of the inner chain links 20 are sandwiched between the longitudinal chain link elements 11, 12 of the outer chain links 10, i.e. the longitudinal chain link elements 21, 22 of the inner chain links 20 are located in between the longitudinal chain link elements 11, 12 of the outer chain links 10. Outer chain links 10 and inner chain links 20 are provided alternatingly along the longitudinal direction of each drive chain 2a, 2b.

Similar to the chain links 10, 20, the carrier units 40 respectively comprise an outer longitudinal carrier element 41 and an inner longitudinal carrier element 42 extending parallel to each other. The support/engagement elements 43, 44 are rotatably sandwiched between said outer and inner longitudinal carrier elements 41, 42.

Axles 19, 29, 49 extend between the chain link elements 11, 12 of the outer chain links 10, the chain link elements 21, 22 of the inner chain link 20 and the outer and inner carrier elements 41, 42 of the carrier unit 40, respectively.

At least the axles 29, 49 of the inner chain links 20 and the carrier units 40 are provided as hollow axles 29, 49.

In the assembled state of the drive chain 2a, 2b the axles 19 of the outer links 10 extend through the hollow axles 29 of the inner links 20 and the axles 29 of the inner links 20 (together with the axles 19 of the outer links 10) extend through the hollow axles 49 of the carrier units 40 providing a joint 30 of the drive chain 2a, 2b pivotably connecting two consecutive drive chain links 10, 20 with each other. Each joint 30 comprises three axles 19, 29, 49, which are coaxially arranged rotatably with respect to each other.

In the embodiment shown in FIG. 3 the carrier units 40 are mounted to the joints 30 at a position which is located out of the respective carrier unit's 40 center, when viewed along the longitudinal (conveying) direction. In consequence, the distance between the first support/engagement element 43 and the joint 30 is larger than the distance between the second support/engagement element 44 and said joint 30, when viewed along the longitudinal (conveying) direction of the drive chain 2.

The consequences of different positions of the joint 30 with respect to the support/engagement elements 43, 44 will be discussed further below with respect to FIG. 6.

Figure 4:
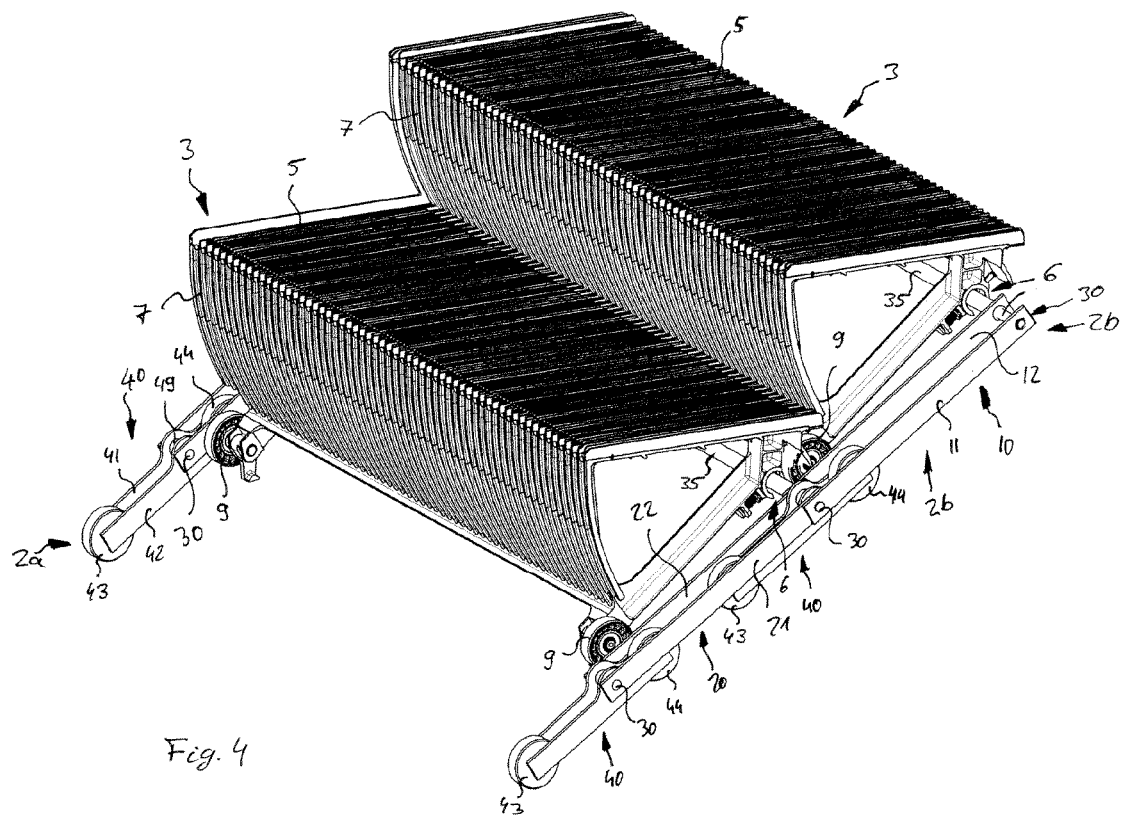

FIG. 4 shows the same portion of the drive system as shown in FIG. 3 together with two conveyor elements 3 which are configured for supporting and conveying passengers. In the embodiment shown in FIG. 4, the conveyor elements 3 are provided in the form of escalator steps 3 respectively comprising a basically horizontal tread portion 5 and a basically vertical arcuate riser portion 7 as it is known in the art. The skilled person, however, will easily understand that the invention just as well may be applied to a horizontally extending people conveyor (moving walkway) which comprises a plurality of pallets or tread plates instead of the steps 3.

The conveyor elements 3 are supported by the step axles 35 extending between the two parallel drive chains 2a, 2b by means of bearings or clamps 6 at least partially encompassing the respective step axle 35.

A portion of the respective conveyor element 3, which is located opposite to the bearings or clamps 6, i.e. a portion of the conveyor element 3 facing away from the step axle 35, is provided with two step rollers 9 which are configured to cooperate with corresponding step roller guide rails (which are not shown in FIG. 4) for pivoting the conveyor elements 3 in the transition portions and in the turnaround portions 82, 84 of the drive chains 2a, 2b, as it is known in the art of chain driven people conveyors (see e.g. FIG. 1).

In the embodiment shown in FIG. 4, each drive chain 2a, 2b comprises only a single chain link 10, 20 for every conveyor element 3, i.e. the number of chain links 10, 20 in each drive chain 2a, 2b is identical to the number of conveyor elements 3. However, by means of the carrier unit 40, two support/engagement elements 43, 44 are provided at every joint 30, and thus each conveyor element 3 is supported by two support/engagement elements 43, 44 of each drive chain 2a, 2b.

In consequence, although the pitch of the drive chains 2a, 2b is identical to the pitch of the conveying elements 3 (each drive chain 2a, 2b comprises only a single chain link 10, 20 for each of the conveyor elements 3), since every drive chain 2a, 2b comprises twice as many support/engagement elements 43, 44 as chain links 10, 20 and conveyor elements 3, respectively, the load to be carried by each of the support/engagement elements 43, 44 is considerably reduced. Details of the load distribution will be discussed further below with reference to FIG. 5. A configuration where the pitch of the drive chain 2a, 2b is identical to the pitch of the conveying elements 3 has the particular advantage that the sizes of the gaps formed in between two consecutive conveyor elements remain constant along the load track of the people conveyor.

In an alternative embodiment, which is not shown in the figures, the carrier units 40 may be arranged not inside the chain links 10, 20, i.e. between the inner and the outer chain link elements 11, 12, 13, 14, but next to the chain links 10, 20 either between the chain links 10, 20 and the conveying elements 3 or outside the step chain 2, i.e. on the side of the step chain 2 opposite to the conveying elements 3.

Figure 5:
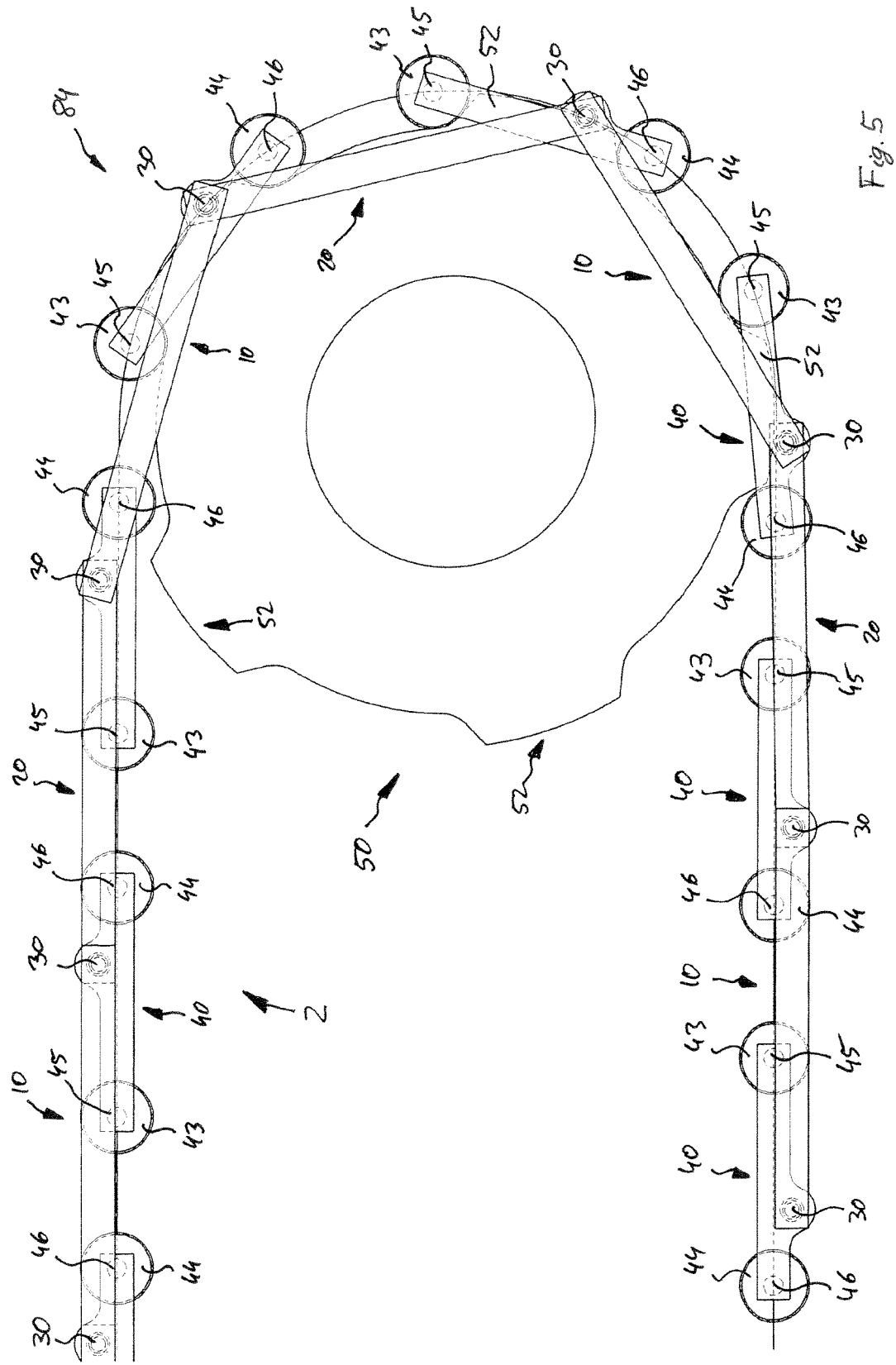

FIG. 5 shows a schematic side view of a drive chain 2 according to an exemplary embodiment of the invention in a turnaround portion 84 of the chain drive.

The structure of the drive chain 2 shown in FIG. 5 is identical to the structure of each of the drive chains 2a, 2b shown in FIGS. 2 and 3 and therefore the identical features will not be discussed in detail again.

In the turnaround portion of the drive chain 2 a turnaround element 50 having the form of a sprocket 50 comprising a plurality of engagement portions 52 is provided for engagement with the drive chain 2.

The engagement portions 52 of the turnaround element 50 are configured to engage with both support/engagement elements 43, 44 of the drive chain 2, which are rotatably supported by the carrier units 40 by means of bearings 45, 46, when the drive chain 2 deflects around the periphery of the turnaround element 50.

Since the carrier units 40 supporting said support/engagement elements 43, 44 are pivotably linked to the joints 30 of the drive chain 2, the position of the support/engagement elements 43, 44 may adjust to the radius of the turnaround element 50 when the drive chain 2 winds around the turnaround element 50, as it is shown in FIG. 5. Contrary to a conventional drive chain, in this configuration the joints 30 do not engage with the turnaround element 50.

As two support/engagement elements 43, 44 are provided for every joint 30 of the drive chain, the number of engagement positions between the drive chain 2 and the turnaround element 50 is twice as large as in a conventional drive chain 2 having the same number of chain links.

As a result, the adverse polygonal effect, which always occurs when a moving chain is deflected from a straight line of travel and which decreases when the number of chain links 10, 20 is increased, may be reduced considerably without increasing the number of chain links 10, 20.

Providing the joint 30 at the center of the carrier unit 40, when viewed along its longitudinal (conveying) direction, is the most preferable position for reducing the load to be carried by each of the support/engagement elements 43, 44. The inventors, however, have discovered that the polygonal effect may be reduced even more efficiently when the joint 30 is not located at the center of the carrier unit 40.

Figure 6:
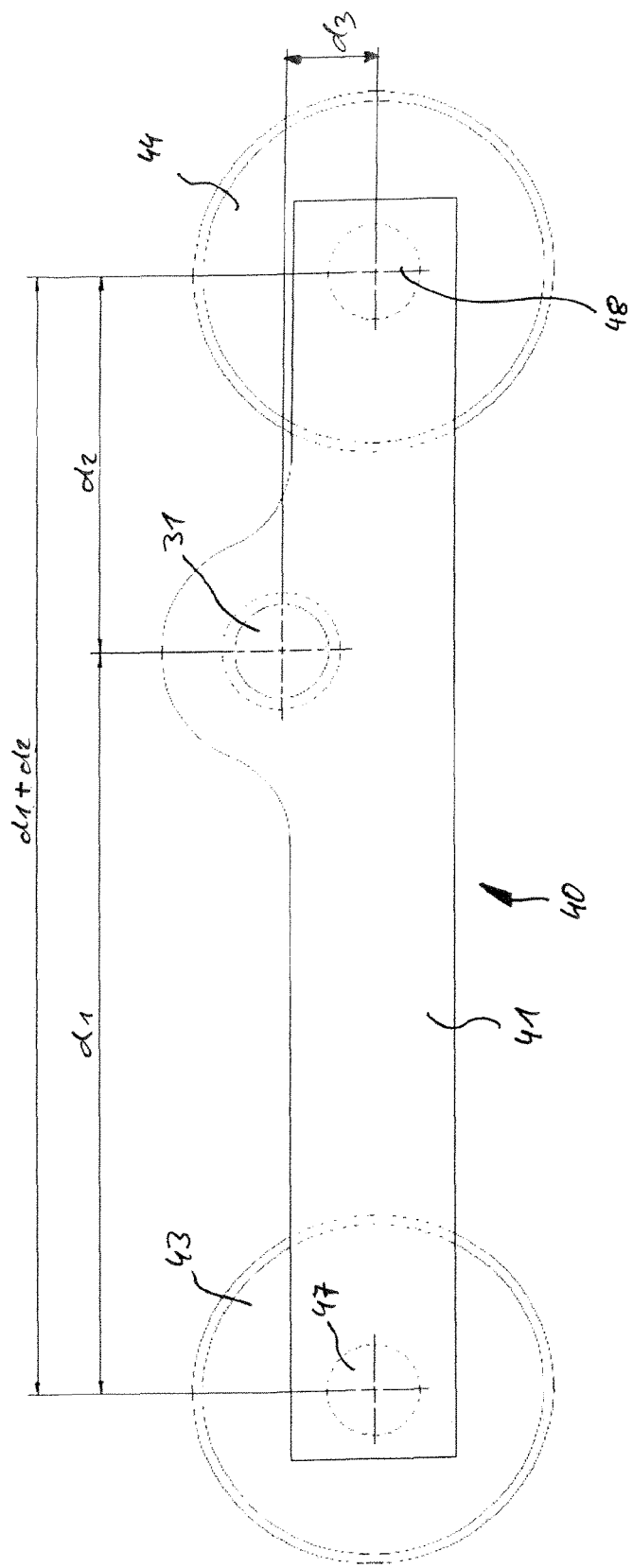

FIG. 6 shows an example of one of the outer/inner carrier elements 41, 42 forming the carrier units 40, which has been optimized for reducing the polygonal effect by locating the opening 31, which is provided for accommodating the joint 30, not at the center of the carrier unit 40 when viewed along its longitudinal direction, but at a position in which the distance $d_1$ of the opening 31 from the first support/engagement element 43 is approximately twice as large as the distance $d_2$ from the second support/engagement element 44.

In this case, the first support/engagement element 43 will have to carry approximately 33% of the load while the second support/engagement element 44 will have to carry approximately 66% of the load, which still is a reduction of 33%.

The relation $d_1:d_2$ of 2:1 of the exemplary embodiment shown in FIG. 6 is only an example and may not be the ideal ratio for a maximal reduction of the polygonal effect for every chain drive configuration. The optimal position of the joint 30 with respect to the support/engagement elements 43, 44, i.e. the ideal ratio $d_1:d_2$, has to be determined individually for each case as it depends on specific parameters of the configuration, including e.g. the vertical distance $d_3$ between the center of the opening 31 and the centers of the openings 45a, 46a which are provided for accommodating the bearings 45, 46 supporting the support/engagement elements 43, 44 in a direction perpendicular to the longitudinal extension of the drive chain 2.

Figure 7:
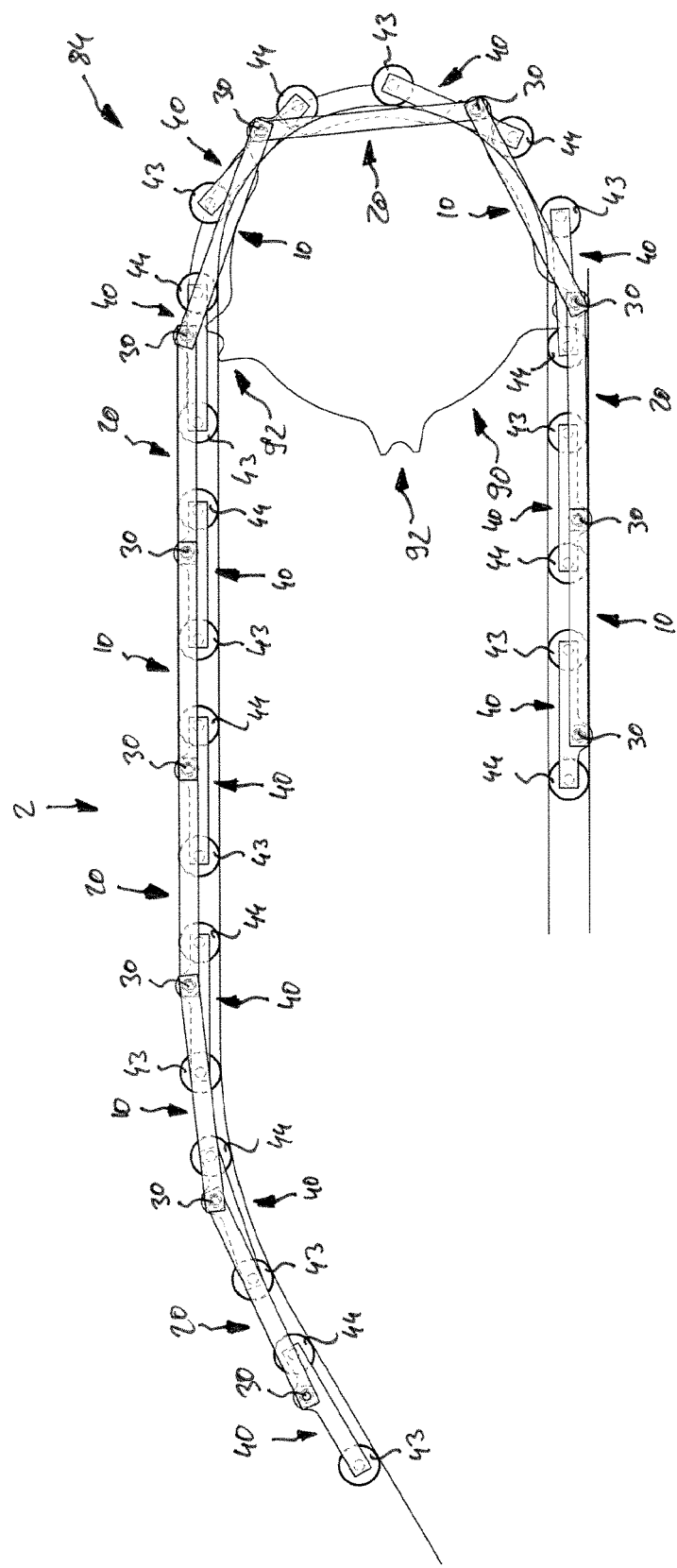

FIG. 7 shows an alternative embodiment of a chain drive mechanism, in which the turnaround element 90 is provided as a sprocket 90 having a plurality of engagement portions 92 which are configured not for engaging with the support/engagement elements 43, 44 but for engaging with the axles 19, 29, 49 of the joints 30.

Figure 8:
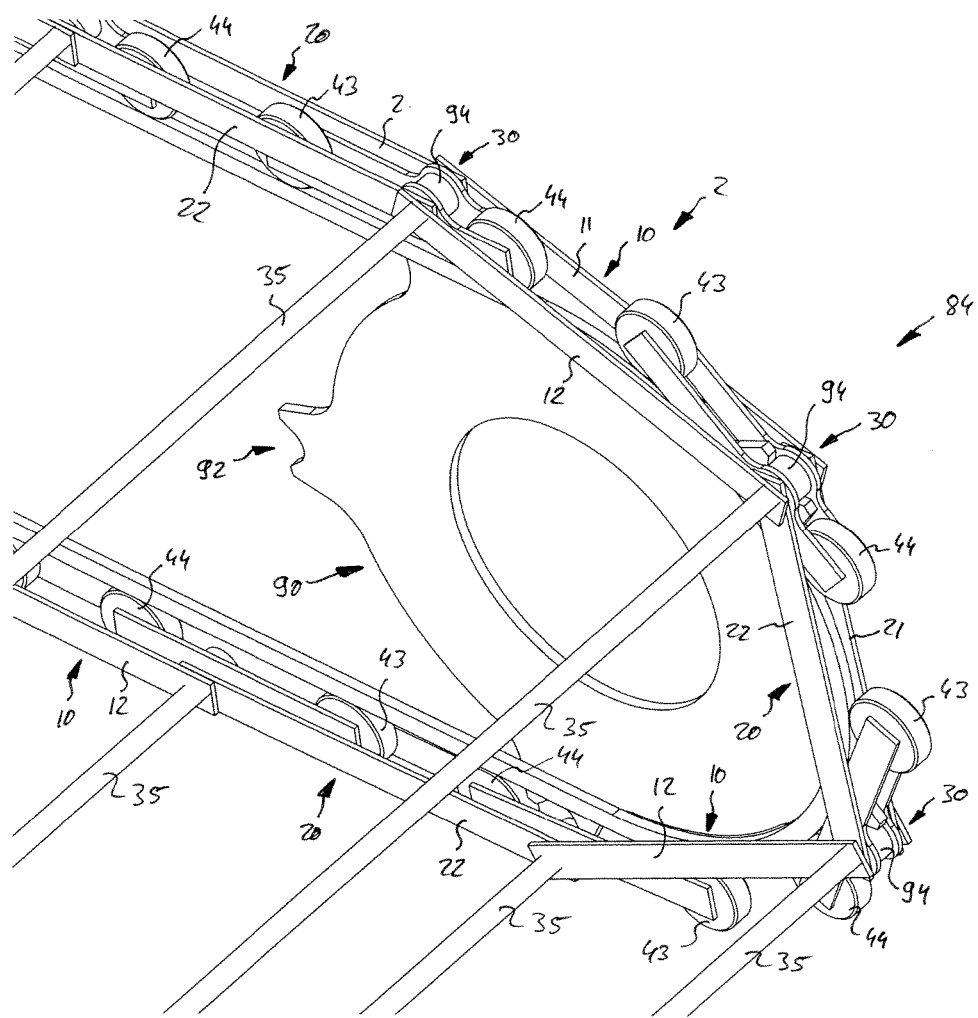

As shown in FIG. 8, axle rollers 94 may be provided on the axles 19, 29, 49 for reducing the friction between the axles 19, 29, 49 and the engagement portions 92 during engagement. As a first option, the engagement portions 92 of the turnaround element 90 may engage with the axles 19, 29, 49 or axle rollers 94 at positions which are located inside the chain links 10, 20, i.e. between the inner and outer chain link elements 11, 12, 21, 22, as it is shown in FIG. 8.

Figure 9:
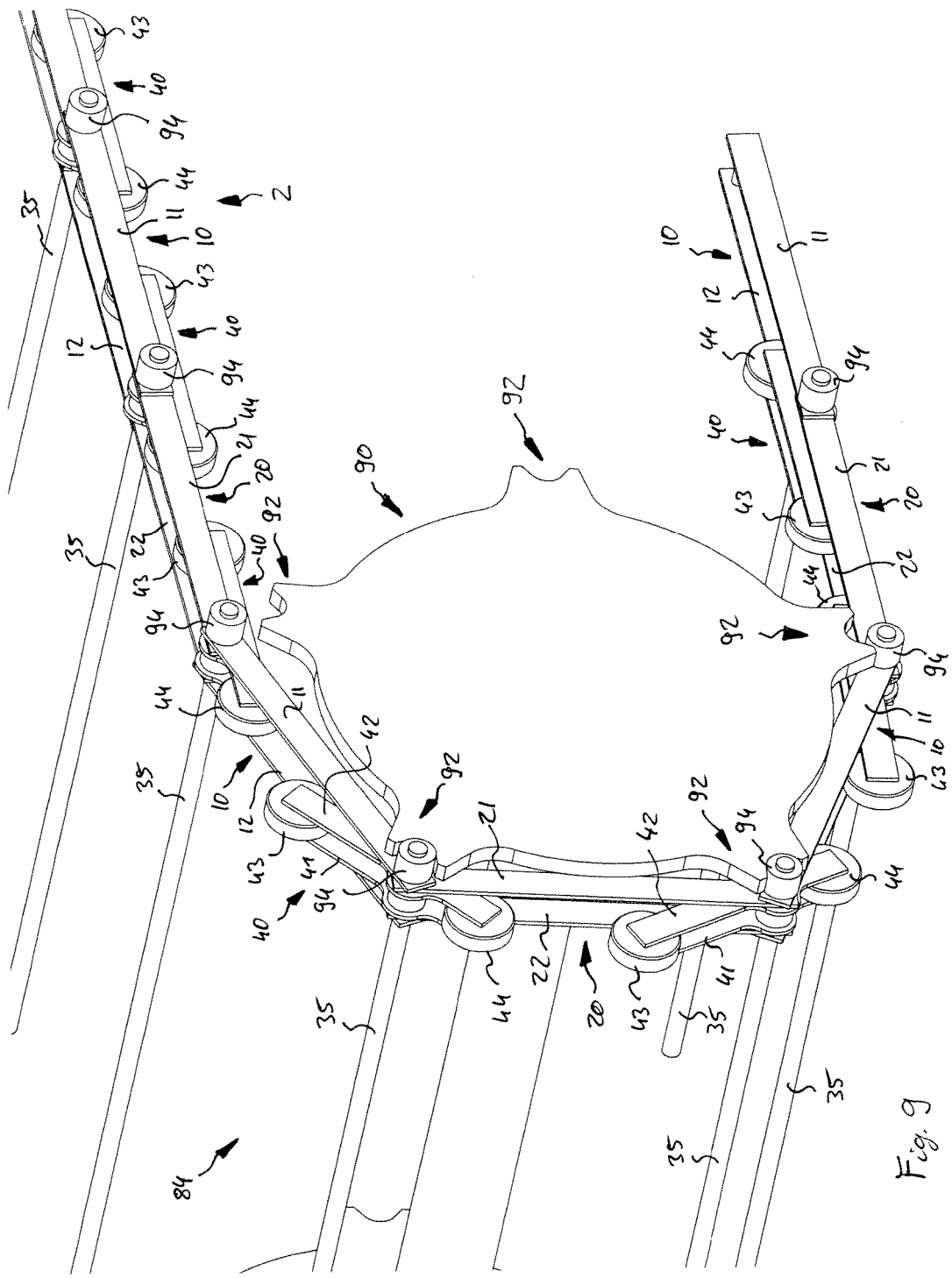

In order to avoid interference of the chain link elements 11, 12, 21, 22 with the outer periphery of the turnaround element 90, which may occur in particular when the turnaround element 90 has a small radius and/or a centered position of the carrier unit 40 is employed, alternatively the engagement portions 92 of the turnaround element 90 may engage with the axles 19, 29, 49 or axle rollers 94 at positions outside the chain links 10, 20 next to the inner or outer chain link elements 11, 12, 21, 22, either on the inner side of the step chain 2 facing the conveyor elements 3 (not shown), as it is shown in FIG. 9, or on the outer side of the step chain 2 opposite to the conveying elements 3.

Figure 10:
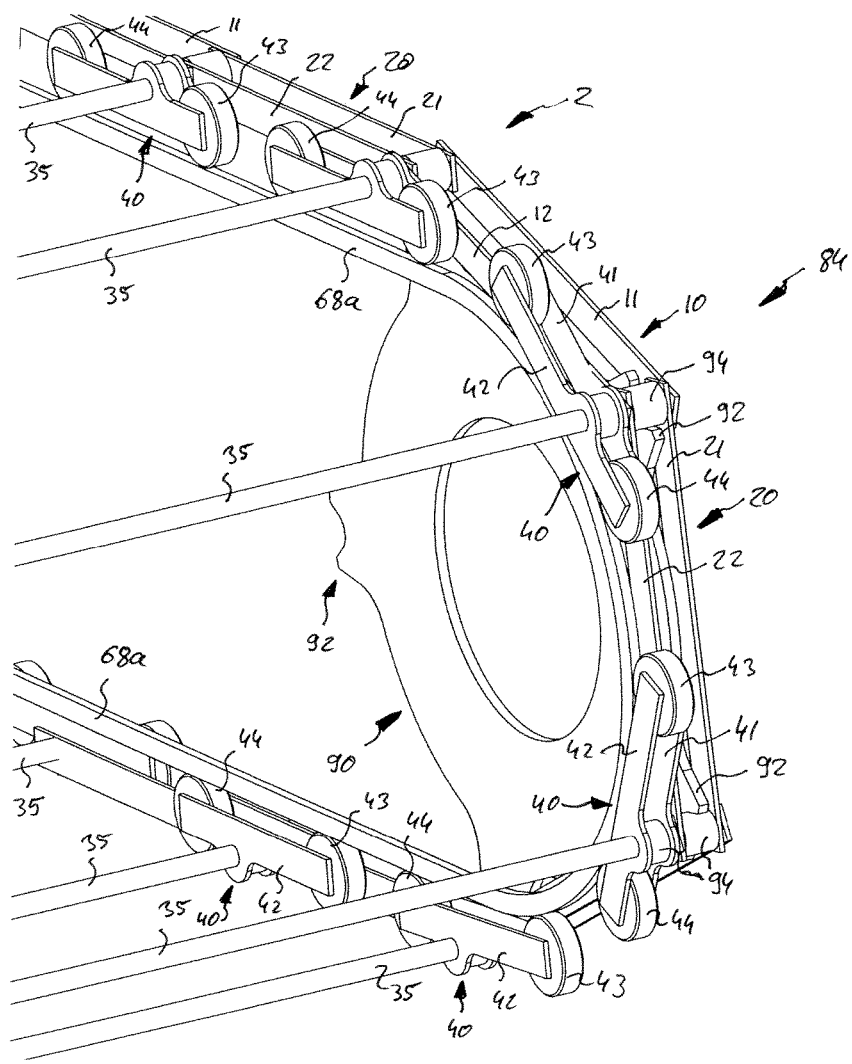

In yet another configuration, which is shown in FIG. 10, the engagement portions 92 of the turnaround element 90 engage with the axles 19, 29, 49 or axle rollers 94 at a position which is located inside the chain links 10, 20, similar to the configuration shown in FIG. 8. In this configuration, however, the carrier units 40 supporting the support/engagement elements 43, 44 are not sandwiched between the inner or outer chain link elements 11, 12, 21, 22, but are arranged outside the chain links 10, 20 either on the inner side of the step chain 2 next to the conveyor elements 3 (not shown), as it is shown in FIG. 10, or on the outer side of the step chain 2 opposite to the conveying elements 3.

Arranging the carrier units 40 outside the chain links 10, 20 allows the support/engagement elements 43, 44 to run on the step chain guide rail 68a even in the turnaround portions 82, 84. In this case, the sections of the step chain guide rails 68a, 68b close to the turnaround portions 82, 84 may be provided having a special form which is designed for guiding the support/engagement elements 43, 44 before engagement and after disengagement with the turnaround element 90 in order to compensate for the polygonal effect.

In the configurations shown in FIGS. 7 to 10, in which the turnaround element 90 engages with the axles 19, 29, 49 of the joints 30, the engagement between the turnaround element 90 and the drive chain 2 is similar to the engagement in a "classical" chain drive, as it is known in the prior art. In particular, with respect to engagement the "effective" chain link length is not changed in comparison with the "classical" configuration. However, the load, which is to be carried by each of the support/engagement elements 43, 44, is considerably reduced as the weight is distributed to the two support/engagement elements 43, 44 which are provided for every chain link 10, 20.

Elastic plastic rollers, which, when running along the step chain guide rails 68a, 68b, generate less noise and provide more riding comfort than metal/steel rollers, may be used as support/engagement element 43, 44. The axle rollers 94 make less rotational movement than the support/engagement elements 43, 44 but are subjected to large radial forces which are caused by the large driving forces transferred from the engagement element 90 to the drive chain 2. Thus, it is beneficial to use more robust metal/steel rollers for the axle rollers 94 which are in engagement with the engagement portions 92 of the turnaround element 90.

Figure 11:
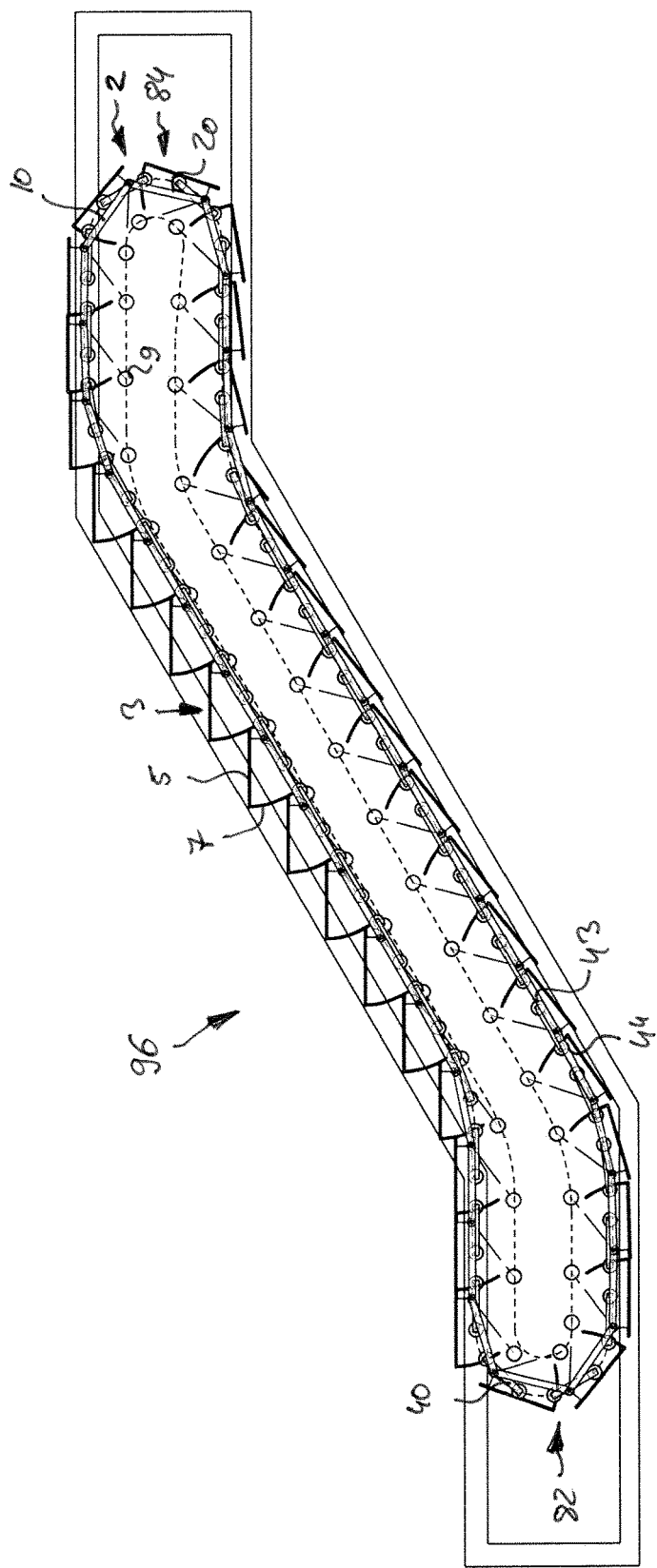

FIG. 11 shows a schematic view of a conveyor 96 in the form of an escalator 96 comprising a drive chain 2 which is formed according to an exemplary embodiment of the invention. Features, which are identical or similar to the corresponding features shown in FIG. 1, are denoted with the same reference signs and will not be discussed in detail again. For reasons of clarity, the step chain guide rails 68a, 68b, the step roller guide rails 70a, 70b, the engagement element 90 and the chain drive/motor 72 are not shown in FIG. 11.

FIG. 11 illustrates that the effective chain link length of the drive chain 2 is reduced, as two support/engagement elements (rollers) 43, 44 are provided for each chain link 10, 20, respectively. This considerably reduces the load to be supported by each of the support/engagement elements 43, 44. In an embodiment, in which not the axles 19, 29, 49 of the joints 30 but the support/engagement elements 43, 44 engage with the turnaround element(s) 50, 90 the polygonal effect is reduced, since the pivotably supported drive units 40 carrying the support/engagement elements 43, 44 reduce the effective chain link length in the turnaround portions 82, 84 without increasing the number of chain links 10, 20 and allow to adjust the positions of the support/engagement elements 43, 44 in the turnaround portions 82, 84 of the drive chain 2.

The following figures show exemplary embodiments of the invention being employed in combination with the "arc bucket step concept".

According to the "arc bucket step concept", the steps 100 are provided in the form of arc bucket steps 100 comprising two main parts, the step tread plate 102 and the bucket 104 including the riser portion 106, which corresponds to the riser 7 of a classical conveyor step 3, and additional skirt components 108. Step rollers 9 for pivoting the tread plates 7 as required in the transition regions and turnaround regions of the people conveyor are fixedly mounted to the tread plate 102 in such a way that the step rollers 9 travel above the level of the tread plates 102 in the transporting section of the people conveyor, i.e. in the load section between upstream and downstream landing zones of the people conveyor.

FIGS. 12a to 12d illustrate two different possible embodiments of an arc bucket step 100 according to the basic arc bucket concept set out above.

Figure 12A:
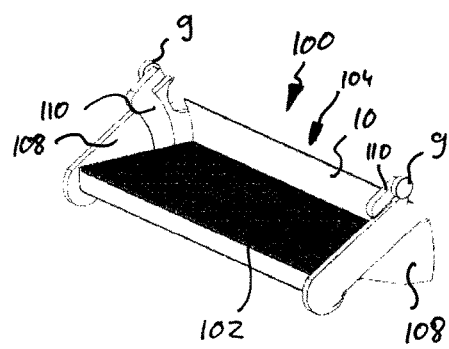
Figure 12B:
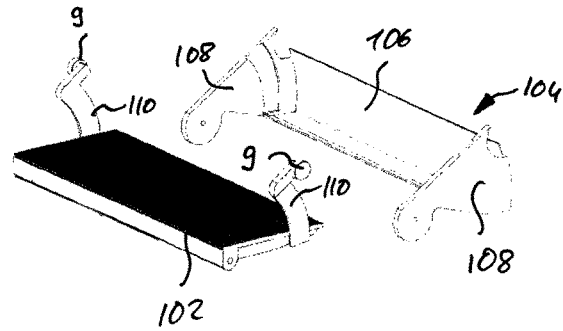

In a first configuration, which is shown in FIGS. 12a and 12b, the arc bucket step 100 is formed by an arc bucket tread plate 102 and a "full" bucket 104, which includes the riser portion 106 and two lateral skirt components 108. The step rollers 9 are fixedly mounted to the tread plate 102 by means of arc levers 110 rising from the tread plates to a level above the lateral skirt components 8 in the load section of the people conveyor. The arc levers 110 are movable with respect to the lateral skirt components 8 along an arcuate shaped recess formed in the lateral skirt components 108. Thereby, the surface of the lateral skirt components 108 with the respective arc levers 110 accommodated in the arcuate shaped recess is always flush on the side facing the passenger section of the people conveyor.

Thereby, any gaps formed in between the lateral skirt components 108 and the arc levers 110 are kept as small as possible with limited movement of the arc levers 110 with respect to the lateral skirt components in order to reduce the risk of parts being entrapped by such gaps.

Figure 12C:
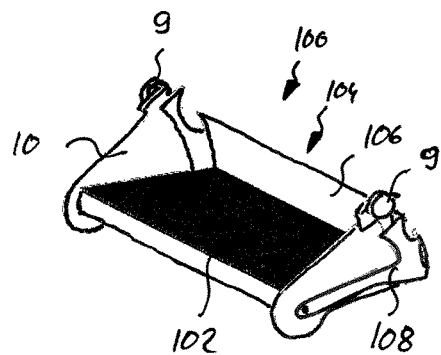
Figure 12D:
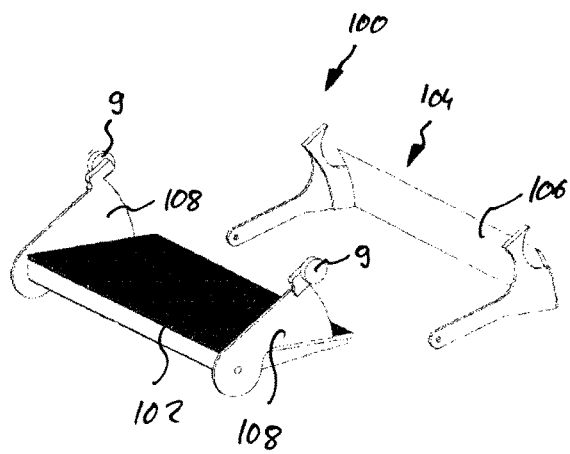

In the second configuration, which is shown in FIGS. 12c and 12d, the lateral skirt components 108 are not integrally formed with the bucket 104, but fixedly mounted to the tread plate 102. In said second configuration, the step rollers 9 are supported by the lateral skirt components 108. As a result, there is no need to provide additional arc levers 110 in this configuration. Rather, the lateral skirt components 108 have an arcuate shape and thereby are able to move with respect to the risers 106 which are provided with correspondingly arcuate shaped or recessed lateral flange portions. Also in this configuration, the lateral skirt components when assembled with the risers 106 form a flush surface facing the passenger section to keep the risk of parts being entrapped as low as possible.

Figure 13:
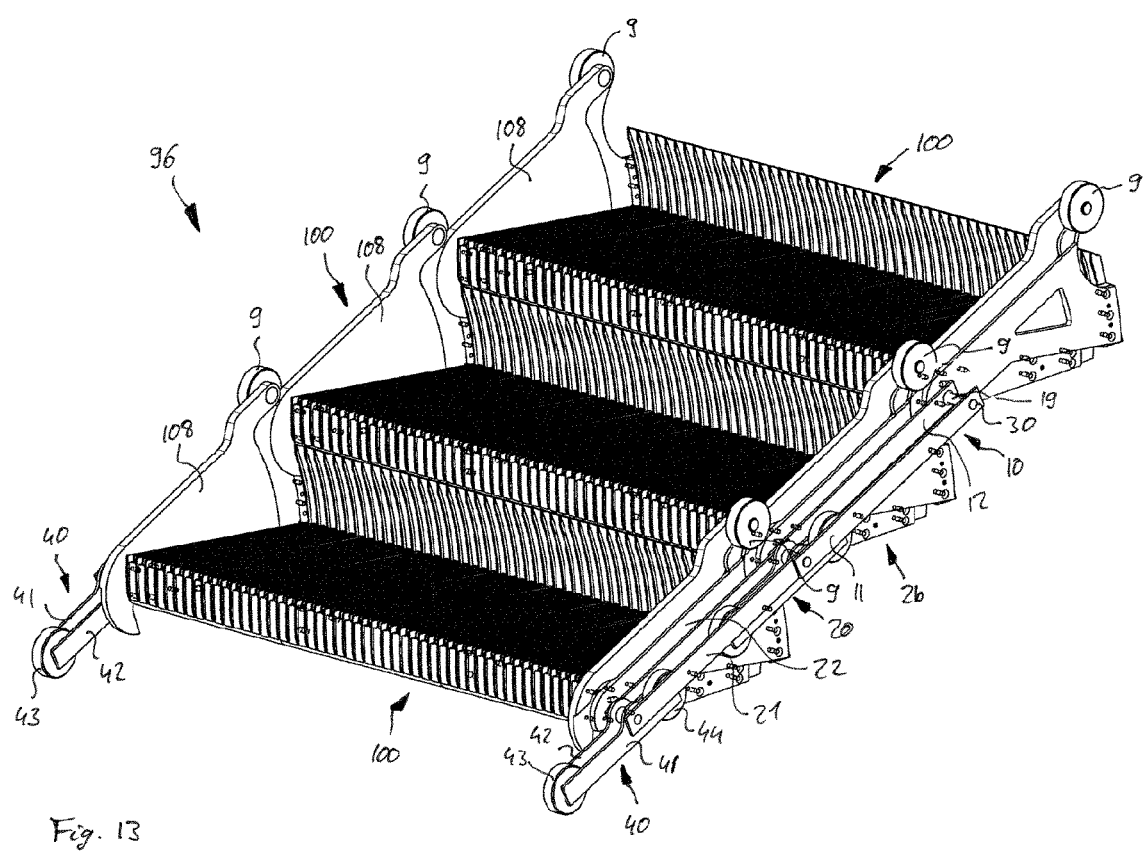

FIG. 13 shows three arc bucket steps 100 according to the second configuration as shown in FIGS. 12c and 12d forming a section of an escalator 96. The drive chain 2, which is mounted to said arc buckets steps 100, is formed according to an embodiment of the invention as it is shown in FIG. 2. In consequence, only a single chain link 10, 20 is needed for each bucket step 100. Thus, there is a 1:1 relation between the bucket steps 100 and the chain links 10, 20 (1:1 configuration).

Figure 14:
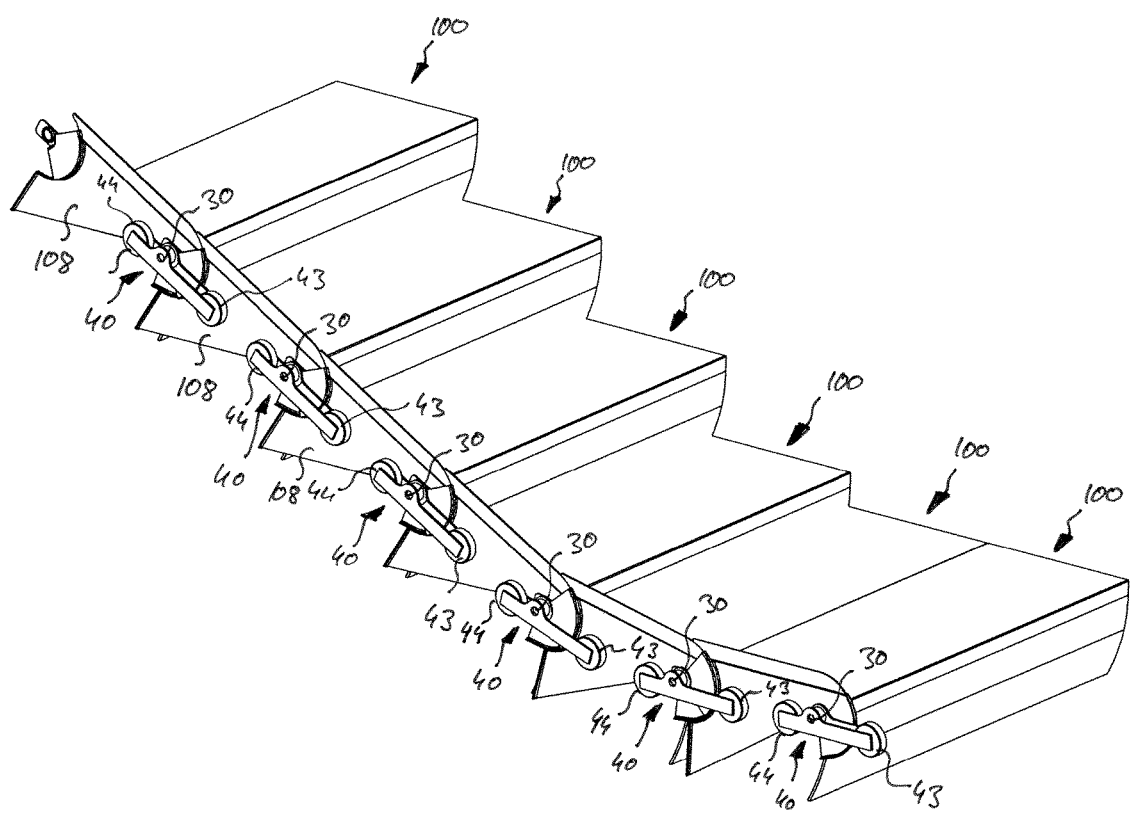

FIG. 14 illustrates yet another embodiment of an escalator 96 according to an embodiment of the invention, in which the drive chain is formed by the arc bucket steps 100 themselves, i.e., the carrier units 40 carrying the support/engagement elements 43, 44 are pivotably mounted directly to the bucket steps 100, which are pivotably linked to each other forming the links of the drive chain 2. In this configuration, there is no need to provide inner and outer link elements 11, 12, 21, 22 forming the chain links 10, 20. Thus, the number of elements is considerably reduced and as a result, the costs for producing, installing and maintaining the escalator 96 may be reduced considerably, as well.

Steps or pallets designed according to the arc bucket step concept described herein might be used in combination with other designs of the drive chain as well, e.g. in combination with a conventional drive chain configuration made up from drive chain links joined via drive chain axles or rollers. Applicant considers the arc bucket step concept a technical contribution to the art for itself and reserves the right to direct claims to such arc bucket step design as disclosed herein, independent of the specific configuration of the drive chain in the embodiment shown in the figures.

Further Embodiments:

A number of optional features are set out in the following. These features may be realized in particular embodiments, alone or in combination with any of the other features:

The carrier units may be pivotably linked to the joints providing a common joint for two adjacent links and the carrier unit provided at said joint. In consequence, no additional joint needs to be provided and the costs for producing and maintaining the drive chain may be kept at minimum.

Alternatively, the carrier units may by pivotably linked to the links at a position in between the joints. Such a configuration allows for more flexibility in choosing the position at which the carrier unit is linked to the chain, but an additional joint for supporting the carrier unit is needed in this case.

The carrier unit in particular may be linked to the center of the respective chain link, when viewed in the longitudinal direction of the chain.

Alternatively, the carrier unit may be linked to a position which is located off said center.

Similarly, the position at which the carrier unit is linked to the chain may be located in the center of the respective carrier unit, when viewed in the longitudinal direction of the chain. This will result in an equal distribution of the load on both support/engagement elements (50%:50%) and it therefore is the optimal position for reducing the load to be carried by the support/engagement elements.

A position off said center of the carrier unit, however, might be more beneficial for effectively reducing the polygonal effect.

Thus, the position at which the carrier unit is linked to the chain may be chosen differently, based on the decision whether an equal distribution (maximal reduction) of the load or an optimal reduction of the polygonal effect is more important in the respective case. Of course, a position providing a fair compromise between these two effects may be chosen, as well.

The support/engagement elements may include rollers, which are capable of rolling along the length of the tracks in order to reduce the friction between the support/engagement elements and the tracks for reducing the wear and noise of the drive and increasing the riding comfort of the passengers. The rollers may be made of plastic providing elastic rollers enhancing the comfort of travel and reducing the noise generated by the rollers.

Each chain link may comprise an outer link element and an inner link element extending basically parallel to each other.

In an embodiment the chain links include outer links and inner links alternately linked to each other, wherein the link elements of the inner links are sandwiched between the link elements of the outer links providing a very rigid and solid structure of the chain. As such a structure is mirror-symmetric with respect to the longitudinal direction of the chain, any lateral forces acting on the elements of the chain are avoided.

In an embodiment each carrier unit is sandwiched between the outer and inner link elements. A link formed by inner and outer link elements sandwiching the carrier unit provides a very rigid and solid chain link structure.

In an alternative embodiment the carrier units are arranged outside the link elements. As in such a configuration no room for housing the carrier units needs to be provided, it allows to form the step chain with a smaller width, i.e. with a smaller lateral distance between the link elements. Additionally, it is possible to avoid interference between the inner and outer link elements of the drive chain and the surface of the turnaround element/sprocket, in particular when a 50/50 centered carrier unit with a shortened pitch is used in combination with a turnaround element having a small radius.

In an embodiment axles extend between the chain link elements of the outer chain links, the chain link elements of the inner chain link and/or the outer and inner carrier elements of the carrier unit, respectively.

The axles of at least two of the outer chain links, the inner chain links and/or of the carrier units are provided as hollow axles allowing another axle to pass through.

In an embodiment, in an assembled state of the drive chain, the axles of the outer joints extend through the hollow axles of the outer joints and the axles of the inner joints, together with the axles of the outer joints, extend through the hollow axles of the carrier units. This structure provides a joint formed by three axles, which are coaxially arranged and allow the chain link elements and the carrier unit to freely pivot with respect to each other.

A drive mechanism according to an exemplary embodiment of the invention comprises a drive chain, as it has been described before, and a turnaround element for engaging with the support/engagement elements.

The turnaround element in particular may be a sprocket similar to the sprockets as they are used in conventional chain drives.

In a first configuration the axles of the joints of the drive chain engage with the turnaround elements. In such a configuration, it is possible to use steel rollers for the additional rollers, which are mounted on the axles of the joints, instead of less robust plastic rollers, which are usually used as support/engagement elements. Said additional rollers may be placed either inside the chain links, i.e. between the inner and outer link elements, or outside the chain links next either to the inner or to the outer link elements.

Furthermore as in such a configuration the support/engagement elements are not in contact with the turnaround element during engagement it allows to reduce the polygonal effect by providing appropriately shaped guiding tracks for guiding the support/engagement elements during the engagement and disengagement of the chain with the turnaround element.

In a second configuration instead of the axles of the joints the support/engagement elements engage with the turnaround element. This allows to reduce the polygonal effect, as the pivotably supported carrier units respectively carrying at least two support/engagement elements are able to adjust to the curved path of the drive chain in the turnaround portion thereby reducing the effective chain link length in the turnaround portion without increasing the number of chain links.

It is possible that only every second support/engagement element engages with the turnaround element. In this case the additional support/engagement elements, which do not engage with the turnaround element, still contribute to supporting the chain on the support rails, which are provided for supporting the drive chain, reducing the load to be carried by each of the support/engagement elements.

In an embodiment the drive mechanism comprises two drive chains according to exemplary embodiments of the invention extending basically parallel to each other and a plurality of step axles pairwise connecting a joint of the first drive chain with a joint of the second drive chain. Such a structure provides a very solid drive mechanism, which is capable to carry high loads.

Exemplary embodiments of the invention further include a conveyor comprising a plurality of conveyor elements and a drive mechanism according to an exemplary embodiment of the invention. The conveyor elements are linked to the chain, i.e. either to the joints or to the links of the chain and in particular may be linked to step axles pairwise connecting the joints of two drive chains extending parallel to each other, as it has been described before.

In particular a single conveyor element may be linked to each of the chain links or joints, as according to the invention there is no need to provide more chain links than conveyor elements for reducing the polygonal effect and/or the load to be carried by each of the support/engagement elements.

The conveyor may be a people conveyor, in particular an escalator or moving walkway, wherein the conveyor elements are provided in the form of steps or pallets/thread plates, respectively.

When the people conveyor is provided as an escalator, the escalator steps may be formed as so called "bucket steps" comprising a tread plate, a riser portion and lateral skirt components, which are formed either integrally with the tread plate ("half bucket solution") or integrally with the riser portion forming a so called "full bucket".

In an embodiment the bucket steps are directly linked to each other providing a chain of steps. In this case, the carrier units may be mounted directly to the steps avoiding the need of an additional step chain. This reduces the number of components and thus considerably facilitates the production, installation and maintenance of the escalator.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the dependent claims.

REFERENCE NUMERALS 2, 2a, 2b drive chains
3 conveyor element/step
5 horizontal portion of the step/tread plate
7 riser portion
9 step roller
10 outer chain link
11 outer link element
12 inner link element
19 axle of the outer chain link
20 inner chain link
21 outer link element
22 inner link element
29 axle of the inner chain link
30 joint
31 opening for accommodating the joint
35 step axle
40 carrier unit
41 outer carrier element
42 inner carrier element
43, 44 support/engagement elements
45, 46 bearings of the support/engagement elements
47, 48 openings for accommodating the bearings
49 axle of the carrier unit
50 turnaround element/sprocket (first embodiment)
52 engagement portion (first embodiment)
60 people conveyor/escalator (prior art)
62 step chain
64 step chain roller
66 step chain link
68a, 68b step chain guide rails
70a, 70b step roller guide rails
72 chain drive/motor
74, 75 chain drive gears
76 lower landing area
78 upper landing area
80 inclined portion
82 lower turnaround portion
84 upper turnaround portion
86 upper conveyor path
88 lower return path
90 turnaround element/sprocket (alternative embodiment)
92 engagement portion (alternative embodiment)
94 axle roller
96 conveyor/people conveyor/escalator
100 step/arc bucket step
102 tread plate of an arc bucket step
104 bucket of an arc bucket step
106 riser portion of an arc bucket step
108 skirt component of an arc bucket step
110 arc lever of an arc bucket step

The invention claimed is:

1. Drive chain for a chain drive comprising a plurality of chain links and joints connecting two of the chain links forming the drive chain, respectively, wherein
the drive chain further comprises a plurality of carrier units, each of said carrier units being linked to one of the chain links or joints and supporting at least two engagement elements, which are configured for engagement with an appropriate turnaround element for driving the drive chain.

2. Drive chain of claim 1, wherein the carrier units are pivotably linked to the joints or to the chain links of the drive chain.

3. Drive chain of claim 2, wherein the carrier units are linked to the chain links at a position which is located at the center of the respective chain link in the longitudinal direction of the drive chain.

4. Drive chain of claim 2, wherein the carrier units are linked to the chain links at a position which is located off the center of the respective chain link in the longitudinal direction of the drive chain.

5. Drive chain of claim 1, wherein the carrier units are linked to the drive chain at a position which is located at the center of the respective carrier unit in the longitudinal direction of the drive chain.

6. Drive chain of claim 1, wherein the carrier units are linked to the drive chain at a position which is located off the center of the respective carrier unit in the longitudinal direction of the drive chain.

7. Drive chain of claim 1, wherein the engagement elements include rollers, in particular plastic rollers.

8. Drive chain of claim 1 further comprising outer chain links and inner chain links, wherein each chain link comprises an outer longitudinal link element and an inner longitudinal link element extending basically parallel and being alternately linked to each other, wherein the link elements of the inner chain links are sandwiched between the links elements (11, 12) of the outer chain links.

9. Drive chain of claim 8, wherein each carrier unit is sandwiched between the outer longitudinal link elements and the inner longitudinal link elements of adjacent outer and inner chain links.

10. Drive chain of claim 1, wherein the carrier units are located outside the chain links.

11. Drive mechanism comprising at least one drive chain according to claim 1 and a turnaround element, in particular a sprocket, for engaging with the drive chain.

12. Drive mechanism of claim 11, wherein the engagement elements but not the joints engage with the turnaround element.

13. Drive mechanism of claim 12, wherein only every second engagement element engages with the turnaround element.

14. Drive mechanism of claim 11, wherein the joints but not the engagement elements engage with the turnaround element.

15. Drive mechanism of claim 14, wherein additional axle rollers, in particular made of steel, are provided at the joints for engagement with the turnaround element.

16. Drive mechanism of claim 15, wherein said axle rollers are placed either inside the chain links between the inner and outer link elements (11, 12, 21, 22), or outside the chain links (10, 20) next to either the inner or the outer link elements (11, 12, 21, 22).

17. Drive mechanism of claim 11, further comprising at least one guide rail for supporting the engagement elements.

18. Drive mechanism of claim 11 comprising
two drive chains extending basically parallel to each other; and
a plurality of step axles pairwise connecting a joint of the first drive chain with a joint of the second drive chain.

19. Conveyor comprising:
a plurality of conveyor elements; and
a drive mechanism according to claim 11,
wherein the conveyor elements are linked to the drive chain.

20. Conveyor comprising
a plurality of conveyor elements; and
a drive mechanism according to claim 16;
wherein the conveyor elements are linked to the step axles pairwise connecting the drive chains.

21. Conveyor according to claim 19, wherein a single conveyor element is linked to each of the chain links.

22. Conveyor according to claim 19, wherein the conveyor is a people conveyor, in particular an escalator or moving walkway, and the conveyor elements are steps or pallets, respectively.

23. Conveyor according to claim 19, wherein the conveyor is an escalator comprising steps having a tread plate;
a riser portion and lateral skirt components, which are integrally formed either with the tread plate or with the riser portion.

24. Conveyor according to claim 23, wherein the steps are directly linked to each other forming a chain of steps providing the step chain.

25. Conveyor according to claim 24, wherein the carrier units are mounted directly to the steps.

* * * * *